United States Patent [19]
Osterhoff et al.

[11] Patent Number: 5,720,171
[45] Date of Patent: Feb. 24, 1998

[54] DEVICE FOR HEATING AND COOLING A BEVERAGE

[75] Inventors: Michael Osterhoff, Brighton; Jeffrey Bochenek, Milford, both of Mich.; Shillion Mongru, Scarborough, Canada

[73] Assignee: Atoma International, Inc., Farmington Hills, Mich.

[21] Appl. No.: 664,219

[22] Filed: Jun. 11, 1996

[51] Int. Cl.⁶ .................................................. F25B 21/02
[52] U.S. Cl. ...................... 62/3.6; 62/3.2; 62/457.4; 62/298
[58] Field of Search .......................... 62/3.6, 457.4, 62/457.9, 3.2, 298

[56] References Cited

U.S. PATENT DOCUMENTS

| | | |
|---|---|---|
| D. 350,048 | 8/1994 | Kahl et al. . |
| 1,979,222 | 10/1934 | Godwin . |
| 2,148,278 | 2/1939 | Rose . |
| 3,089,317 | 5/1963 | Bufalini . |
| 3,178,896 | 4/1965 | Sandsto . |
| 3,434,302 | 3/1969 | Stoner et al. . |
| 4,870,837 | 10/1989 | Weins . |
| 4,914,920 | 4/1990 | Carnegie et al. . |
| 5,060,479 | 10/1991 | Carmi et al. ................ 62/457.4 |
| 5,301,508 | 4/1994 | Kahl et al. . |
| 5,551,240 | 9/1996 | Faries, Jr. et al. ............ 62/3.6 |
| 5,560,211 | 10/1996 | Parker ......................... 62/3.64 |
| 5,605,048 | 2/1997 | Kozlov et al. ................ 62/3.7 |

*Primary Examiner*—John M. Sollecito
*Attorney, Agent, or Firm*—Pennie & Edmonds LLP

[57] ABSTRACT

A beverage heating and cooling device has at least one removable beverage container holding chamber. Each chamber has a spring mechanism assembly to bias a beverage container against a heat transfer member protruding through the chamber-side-wall opening. An electronic controller controls the operation of a thermoelectric heating and cooling element connected to the heat transfer member. The controller has a thermal fuse to protect the device from overheating in the event that the thermal switches fail to maintain the heat transfer member at a desired temperature range. When used in a motor vehicle with the ignition off, an automatic timer within the controller shuts off the unit after a predetermined time to conserve power.

18 Claims, 9 Drawing Sheets

DEVICE FOR HEATING AND COOLING A BEVERAGE

BACKGROUND

Thermoelectric heating and cooling devices typically use a thermoelectric heating and cooling element (semiconductor). Direct current flowing through the element draws heat from one side to the opposite side of the element. Depending on the current direction, one side of the element is heated and the other side cooled. Reversing the current flow direction changes that heat flow direction. Thus, by changing the current direction, heating and cooling can be selected. Thermoelectric elements have been used in the past to heat beverages. For instance, U.S. Pat. No. 4,914,920 to Carnagie et al. (Carnagie) and U.S. Pat. No. 5,060,479 to Carmi et al (Carmi) both describe a beverage heating and cooling device using a thermoelectric heating and cooling element.

Carnagie provides a chamber equipped with a drain collecting tray for collecting condensate and spilled liquid. A temperature regulator within the device keeps the chamber temperature at a desired setting. A beverage container is merely seated in the chamber in this device. To ensure maximum efficiency, however, it would be desirable for the beverage container to be in an abutting contact with the heat transfer member. Carmi addresses this by providing a lever that pushes the beverage container against the heat transfer member.

SUMMARY

The present beverage heating and cooling device has a removable container holder adapted for accommodating a variety of beverage container shapes and sizes. The device has at least one thermoelectric heating and cooling element, a heat transfer member having a first side and a second side, with the second side thermally connected to one side of the thermoelectric element. The other side of the element is preferably connected to a heat sink cooled by a fan to cool the element during the cooling mode. An electronic controller controls application of direct electric current to the thermoelectric element to control heating and cooling functions thereof. The container holder has a chamber adapted to receive and hold the beverage container in place. The chamber has a side wall and a bottom, with an open top. An opening through the side wall permits the heat transfer member to protrude into the chamber so that the first side abuts against the beverage container placed therein.

Attached to the holder is a spring tab that pushes any beverage container inserted against the heat transfer member. Preferably, the spring tab is positioned diametrically opposite the heat transfer member. The first side of the heat transfer member is complementary to the beverage container, i.e. curved for a cylindrical container.

To accommodate the spring tab, the side wall includes a recess, slot, channel, or the like diametrically opposite the opening. The spring tab has resilient prongs that can be squeezed toward each other. This enables the spring tab to be locked and released from the recess.

Each chamber and its corresponding heat transfer member are formed with complementary guide channels and rails. These features slideably mate with each other to removably secure each chamber to its respective heat transfer member.

According to the present invention, the heating and cooling device includes a second discrete thermoelectric heating and cooling element in thermal contact with an associated discrete heat transfer member. The container holder further includes a second discrete container holding chamber associated with the second thermoelectric element and the second heat transfer member. Accordingly, the holder can receive and hold two beverage containers. Each of these discrete chambers is removable to facilitate cleaning and maintenance. In addition, differently dimensioned chambers can be connected to each heat transfer member to hold differently sized or shaped beverage containers to maximize thermal transfer. Another spring tab is mounted to the second chamber in the same manner as the first chamber.

The electronic controller also controls application of direct electric current to the second element. And it incorporates a thermal fuse to protect against overheating by sensing the temperature of the heat transfer member, the fuse disconnecting the power supply to the device when the sensed temperature exceeds a predetermined value. The heating cooling device contains a thermal fuse unique to each of the two heat transfer members. When a fuse disconnects power due to one side reaching its predetermined value, only the thermoelectric element that corresponds to the thermal fuse is disconnected. The second thermoelectric element remains connected and functional. The thermal fuse is used as a backup to a thermostatic switch that cycles the thermoelectric element on-off in the heating mode and maintains the heat transfer member at a desired temperature range.

The electronic controller incorporates a microprocessor, which accepts various status and sensory inputs and controls the operation of the device. When used in a motor vehicle, the microprocessor can detect off-ignition and turns off the thermoelectric element after a predetermined time. This last feature serves to conserve the battery and prevent unneeded operation, as when the vehicle is unattended.

BRIEF DESCRIPTION OF THE DRAWINGS

These and other features, aspects, and advantages of the present invention will become much more apparent from the following description, appended claims, and accompanying drawings where:

DETAILED DESCRIPTION OF THE DRAWINGS

The present beverage heating and cooling device operates using a thermoelectric heating and cooling element (also known as a semiconductor heat pump), as described for instance in the Carnagie and Carmi patents, the disclosures of which are incorporated by reference.

Figure 1:
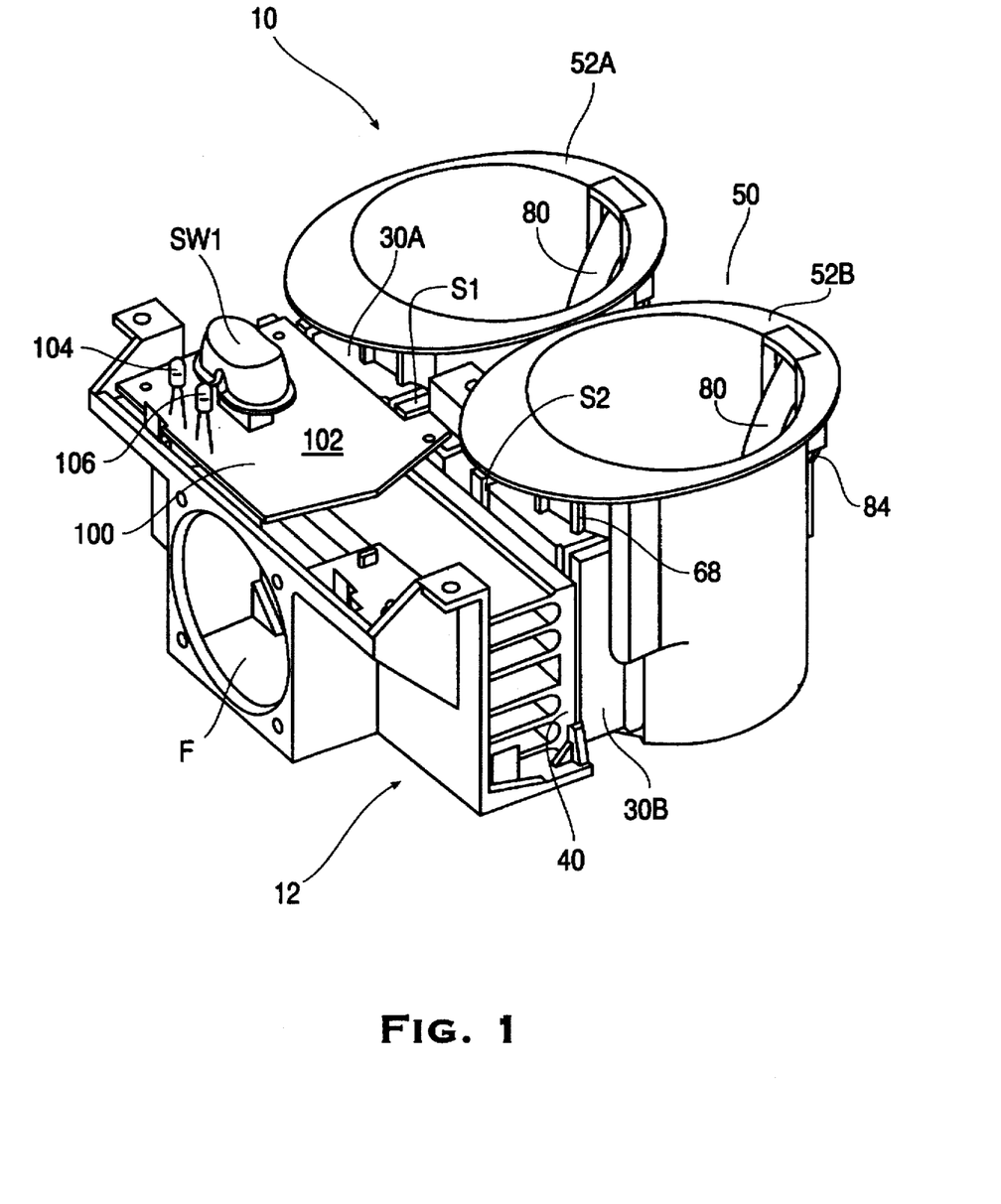
FIG. 1 is a perspective view of the present beverage heating and cooling device, with the main housing removed.
Figure 2:
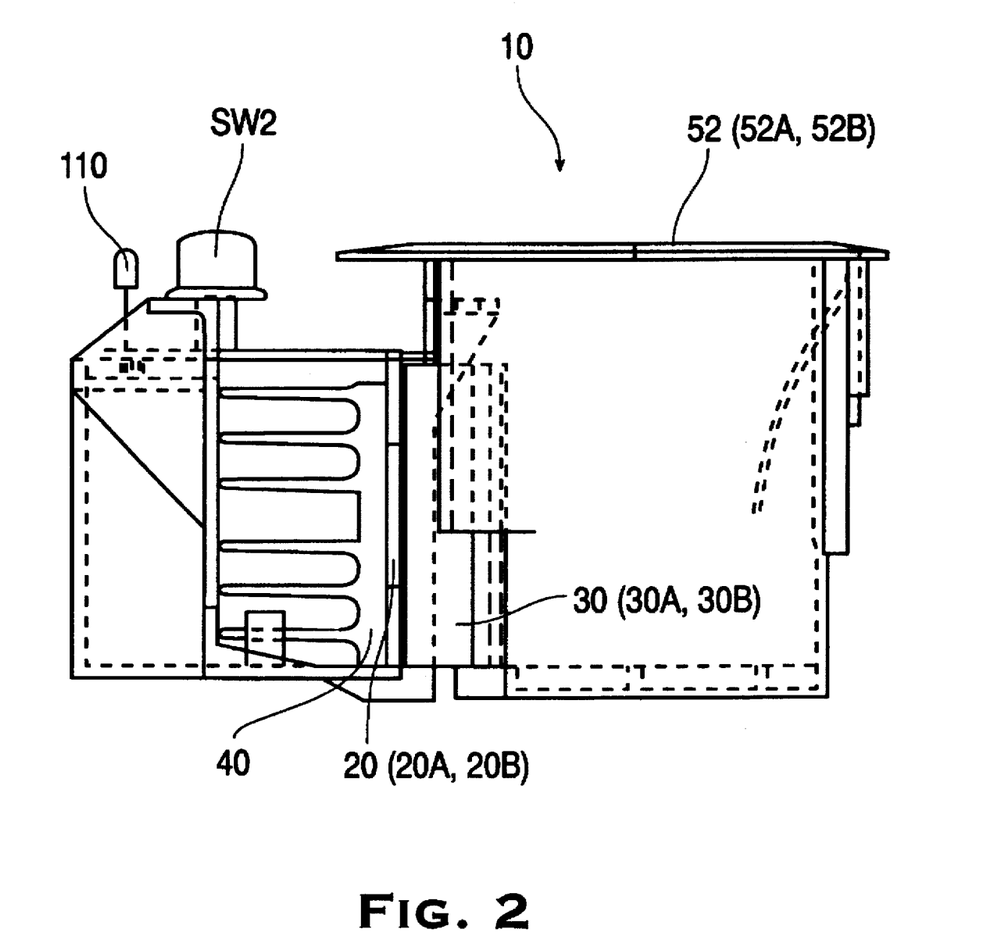
FIG. 2 is a side view of FIG. 1.
Figure 3:
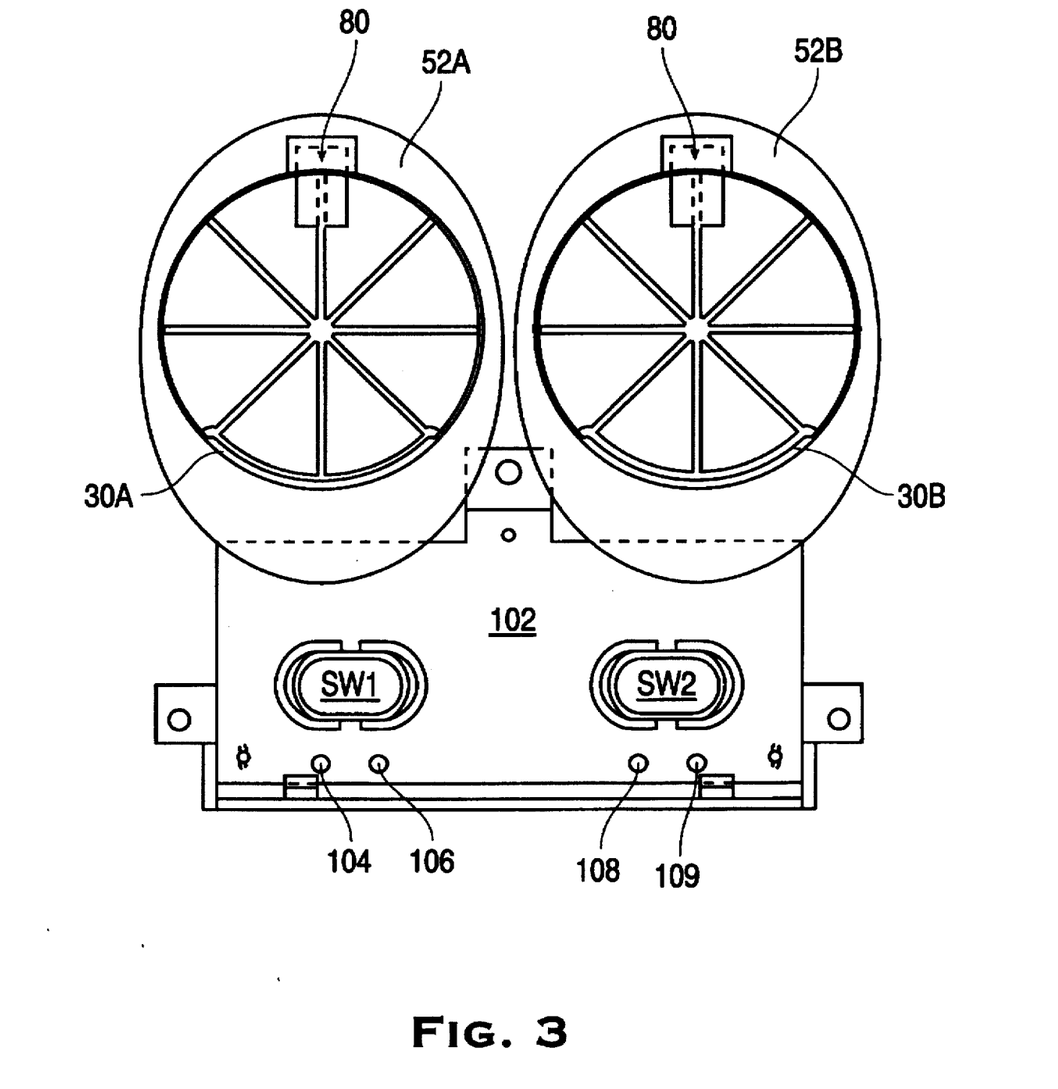
FIG. 3 is a top view of FIG. 1.

FIGS. 1-3 show the preferred embodiment of a heating and cooling device 10, which can accommodate two beverage containers. The device 10 includes two conventional semiconductor heating and cooling elements 20 (20A, 20B), each sandwiched between an associated heat transfer member 30 (30A, 30B) and a heat sink 40. In the preferred embodiment, the device 10 includes two discrete heat transfer members 30A and 30B, one for each heating and cooling element 20A, 20B and one heat sink 40 with a cooling fan 42. The heat sink is thermally connected to both heating and cooling elements 20A and 20B. If desired, two separate heat sinks and two separate cooling fans can also be used. The device 10 further includes a controller 100 for controlling the heating and cooling functions of both elements 20A and 20B, and a beverage container holder 50 for holding two beverage containers. At least the heating and cooling elements 20A, 20B, heat sink 40, and the controller 100 are preferably shrouded or covered in a housing (only partially shown).

Figure 4:
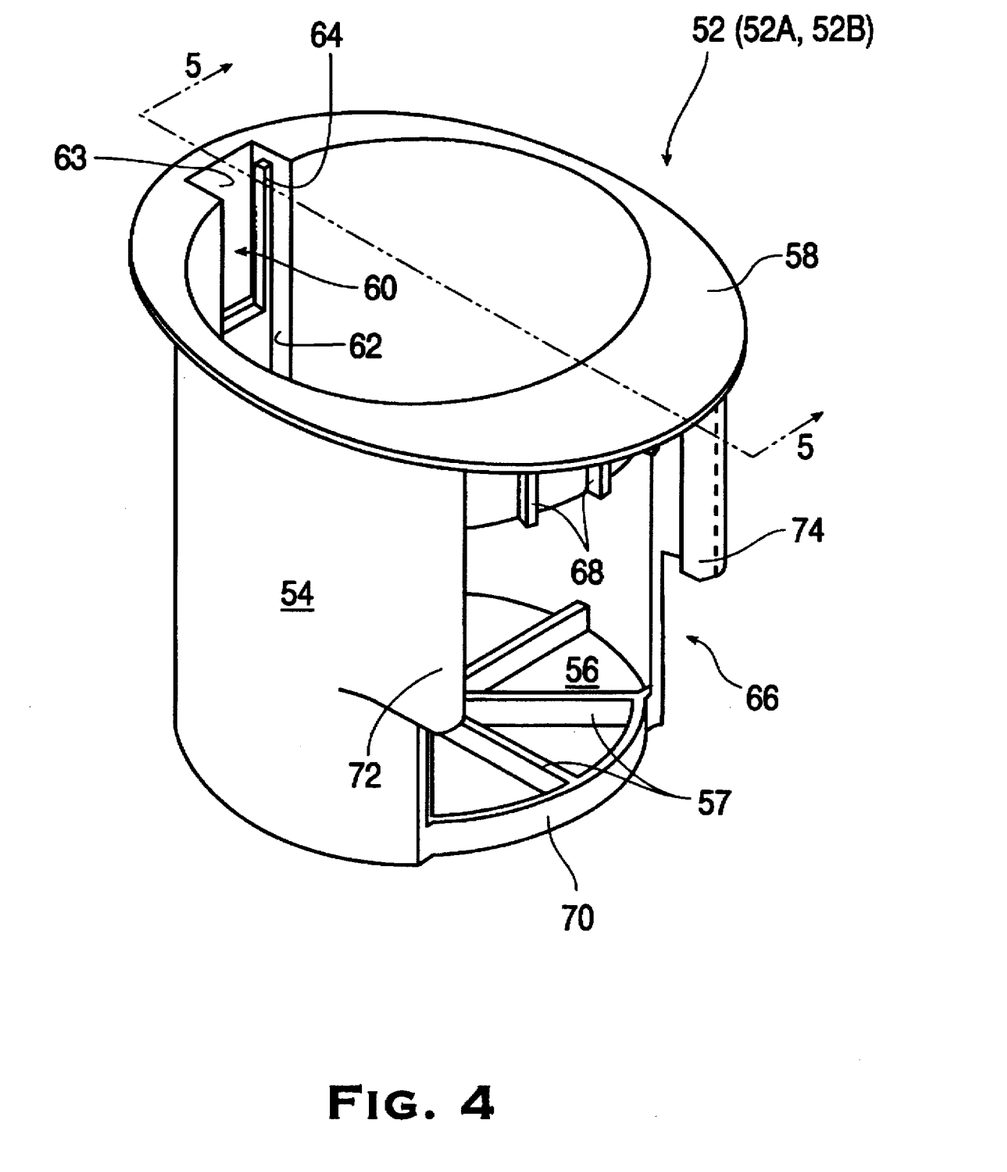
FIG. 4 is a perspective view of the present beverage-container holding chamber.
Figure 5:
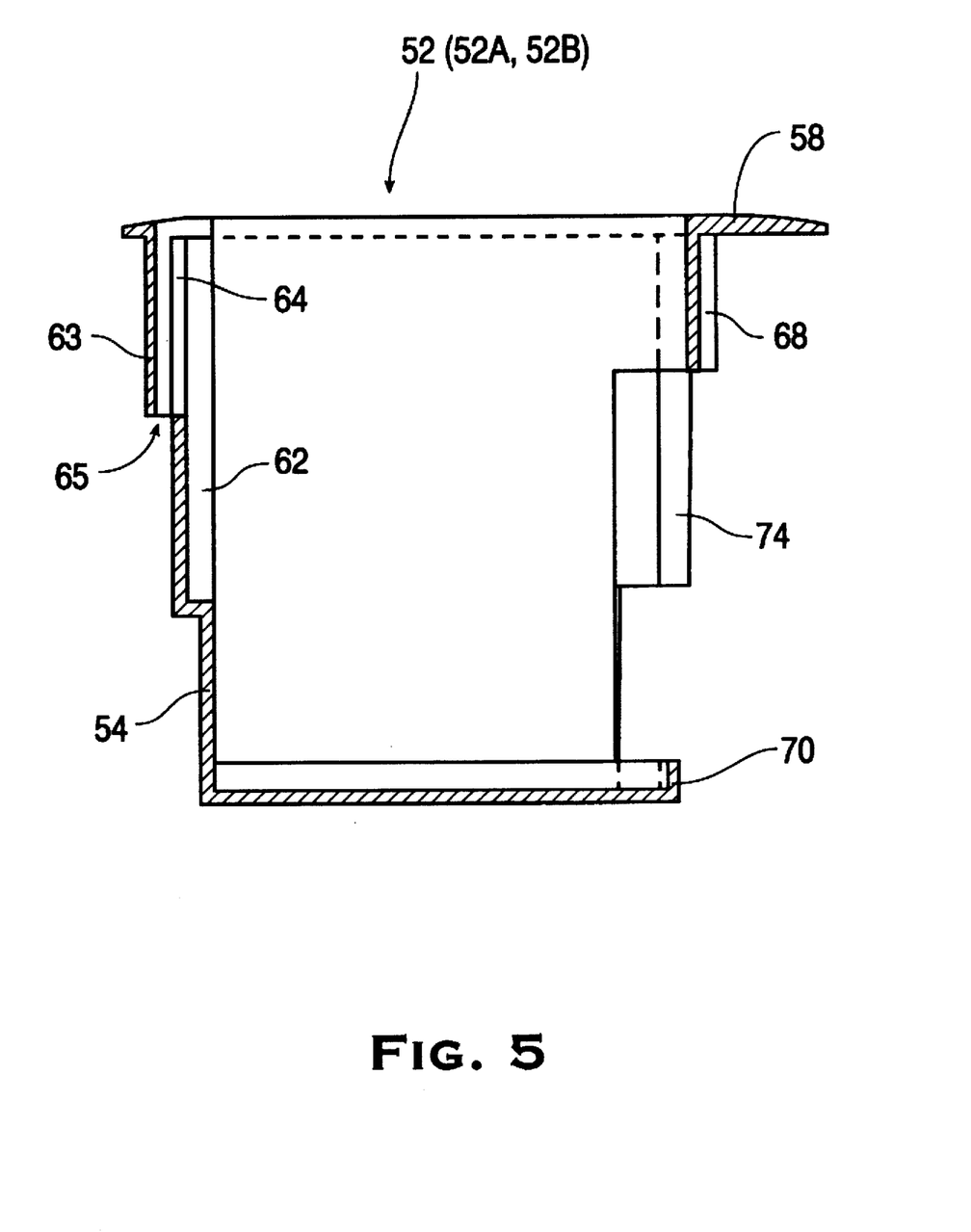
FIG. 5 is a cross-sectional side view of the chamber taken along line 5—5 of FIG. 4.

The beverage container holder 50 includes two identical chambers 52 (52A, 52B). Referring to FIG. 4, each chamber 52 is defined by a substantially cylindrical side wall 54 and a bottom 56. The chamber is dimensioned or configured to receive and hold a beverage container, a cylindrical container in the preferred embodiment. A radially extending oval lip 58 on the top end facilitates grasping of the chamber and covers the opening in the housing or cover that it drops through to mate with the heat transfer member. A substantially rectangular slot or channel or recess 60, or the like is formed through the lip 58 and the side wall 54 to removably and securely seat a spring tab assembly 80 as shown in FIGS. 1–3 and 6. The slot is defined by two lateral walls 62 and a back wall 63. The slot also has a vertical guide strip 64 at each lateral wall for guiding the spring tab assembly into the recess. The chamber bottom 56 has raised radially extending spokes 57 on which the beverage container bottom rests. Any condensate and spilled liquids drip to the bottom and collect between the spokes and can be disposed of upon removal of the chamber or by inverting the device.

Each chamber also has an opening 66 diametrically opposite the recess 60 through which the heat transfer member 30 (30A, 30B) is inserted. The opening 66 can have any shape, but is preferably complementary to the heat transfer member configuration, which is rectangular in the preferred embodiment. Vertical stops 68 extend downwardly on the outer side of the side wall 54 from the lip 58 to the top of the rectangular opening, which extends vertically downward from the point below the lip 58 where stops 68 end to the bottom as shown in FIG. 4. A lower vertical wall 70 is provided to prevent any liquid collected at the bottom from dribbling out. The height of the vertical wall 70 is preferably flush with the spokes and has an outer perimeter smaller than that of the side wall 54 so that the heat transfer member can protrude slightly into the chamber as shown in FIG. 3.

Two parallel U-shaped or hook-shaped channel members 72, 74 extend outwardly from the side wall 54 on either side of the opening 66. These members extend downwardly from the lip 58 for a significant portion of the side wall height and cooperate with a pair of complementary guide rails 36, 38 formed on the heat transfer member 30.

Figure 6:
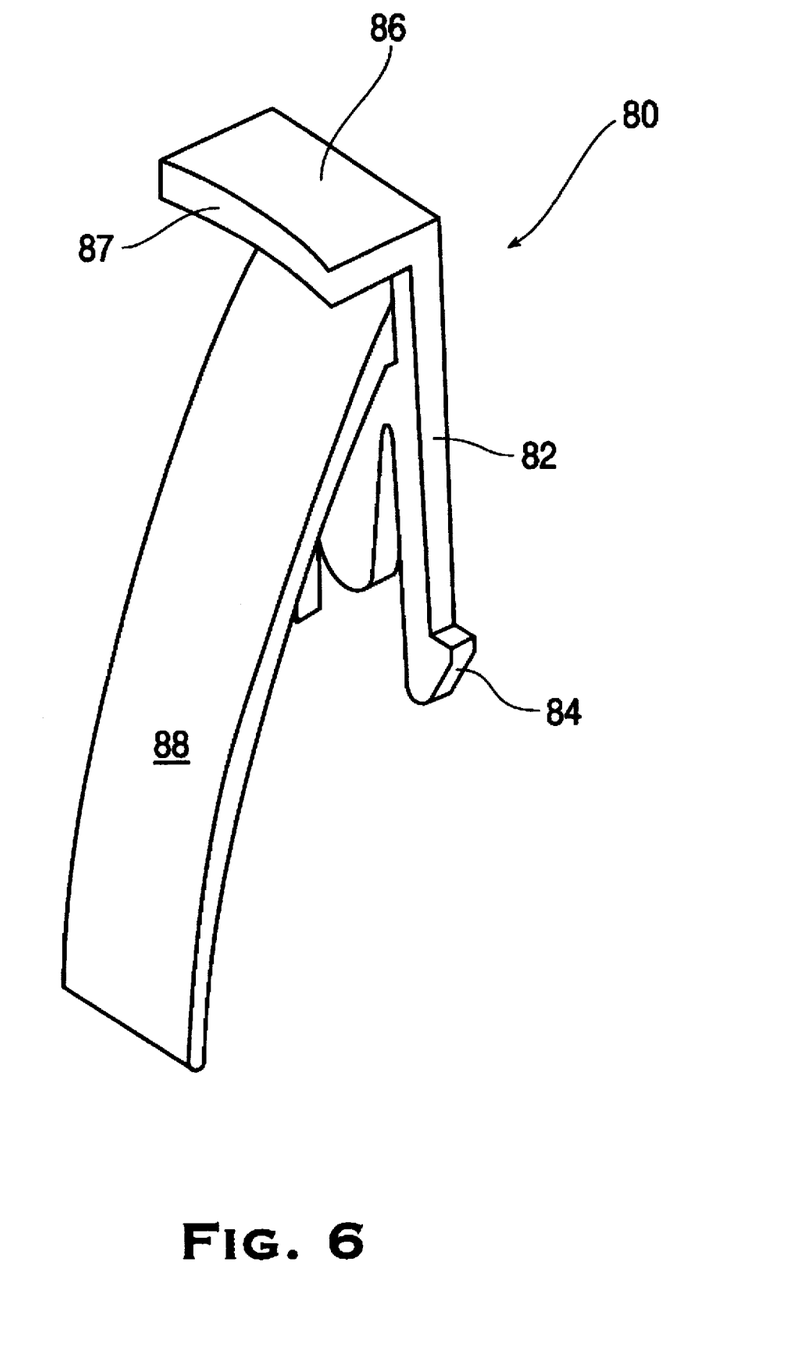
FIG. 6 is a spring tab adapted for holding a beverage container.

FIG. 6 shows the spring tab assembly 80 which includes a pair of longitudinal resilient arms or prongs 82, each with a one-way hook-like stop 84 formed at the free end of it. The prongs are dimensioned to cooperate with the recess 60 formed on the chamber 52. Specifically, the prong free ends are inserted first into the spaced defined between the back wall and the vertical guides 64. As the stops engage the lateral walls 62, the prongs are squeezed toward each other to enable them to slide through the recess. The stops exit the recess when the assembly 80 is fully seated in it. When the stops no longer engage the lateral walls 62, the prongs extend outwardly to their original positions. At this point, the stops abut against the lateral wall lower edge 65, as shown in FIG. 1, and secure the spring tab assembly to the recess. The assembly 80 is removable by pinching the prongs toward each other to clear the stops 84 from the lower edge 65 and pushing or pulling the assembly up and out of the recess 60.

The top 86 of the spring tab assembly is also flush with the lip 58 when it is fully seated in the recess. The top inner side 87 is curved to conform with the lip's inner periphery configuration. The assembly 80 also has an elongated resilient and flexible spring tab 88 extending downwardly and inwardly toward the chamber from the top portion of the prongs as shown in FIG. 6. The tab 88 is designed to bias the beverage container away from the recess and toward the rectangular slot where the heat transfer member is positioned.

Figure 7:
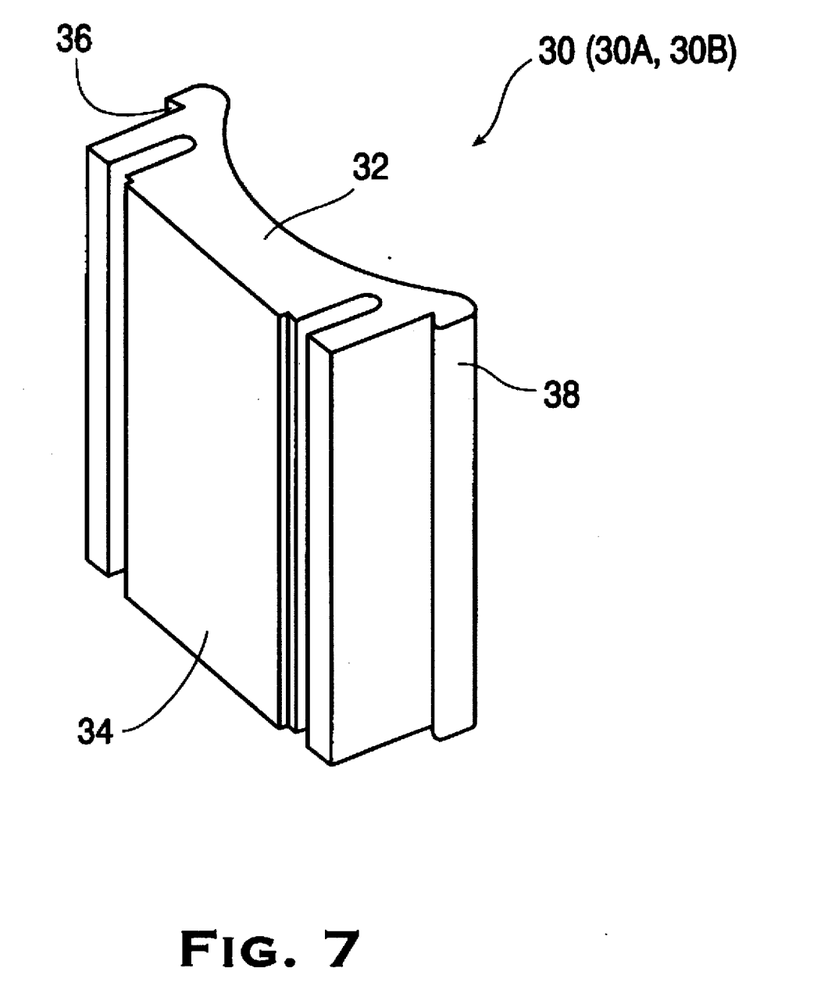
FIG. 7 is a perspective view of the heat transfer member.

Referring to FIG. 7, the heat transfer member 30 has a concave surface 32 on one side and flat face 34 on the opposite side. Dimensions of the concave surface side are approximately the same size as the rectangular opening 66 formed through the chamber 52. The guide rails 36 and 38 complement the channel members 72 and 74 formed on the chamber 52 to enable the chamber to be readily attached and detached. Specifically, the chamber is attached to the heat transfer member by positioning the chamber opening 66 above the heat transfer member and sliding the chamber into the heat transfer member. The channel members slide onto the guide rails and securely hold the chamber to the heat transfer member. The recessed lower wall 70 permits the heat transfer member to position below, in alignment with, the opening 66. The chamber is detached from the heat transfer member by simply pulling it upwardly. The heat transfer member can be made from any heat conducting material such metal, aluminum being preferred due to its light weight.

When the chambers 52 are attached to their respective heat transfer member, the vertical stops 68 abut top of the heat transfer members and accurately position them as shown in FIGS. 1 and 2. In the preferred embodiment, when the chamber is connected to the heat transfer member, the heat transfer member's concave side 32 projects into the chamber as shown in FIG. 3. The spring tab assembly 80 pushes the beverage container placed in the holder against the heat transfer member, which projects through the chamber opening 66.

As shown in FIG. 2, one side of each heating and cooling element 20 abuts the heat transfer member's flat side 34 and the opposite side of the element 20 abuts against the heat sink's flat side. The fan 42 is positioned adjacent the heat sink's side with the fins to cool the heating and cooling elements 20 (20A,20B) when at least one of these elements is turned to the cooling mode. The fan 42 is positioned in the space F provided by a portion of the support member (housing) shown in FIG. 1.

As shown in FIGS. 1–3, the controller 100 is positioned in a circuit board 102. Two ON-OFF-ON user switches SW1 and SW2, one for each heating and cooling elements, are mounted directly onto the board. A red LAMP 104 and a blue LAMP 106 are also connected to the board. These LAMPS are associated with the switch SW1 and are driven by the controller to acknowledge the operational mode. In the preferred embodiment, when the heating is on, the red LAMP lights and when the cooling is on, the blue LAMP lights. Accordingly, depending on the operational mode, only one of these LAMPs lights at a time. When the corresponding element 20A, is off, neither the blue LAMP nor the red LAMP is on. Similarly, a red LAMP 108 and a blue LAMP 109 are connected to the board to indicate the operational mode of the second element 20B in association with the switch SW2.

Figure 8A:
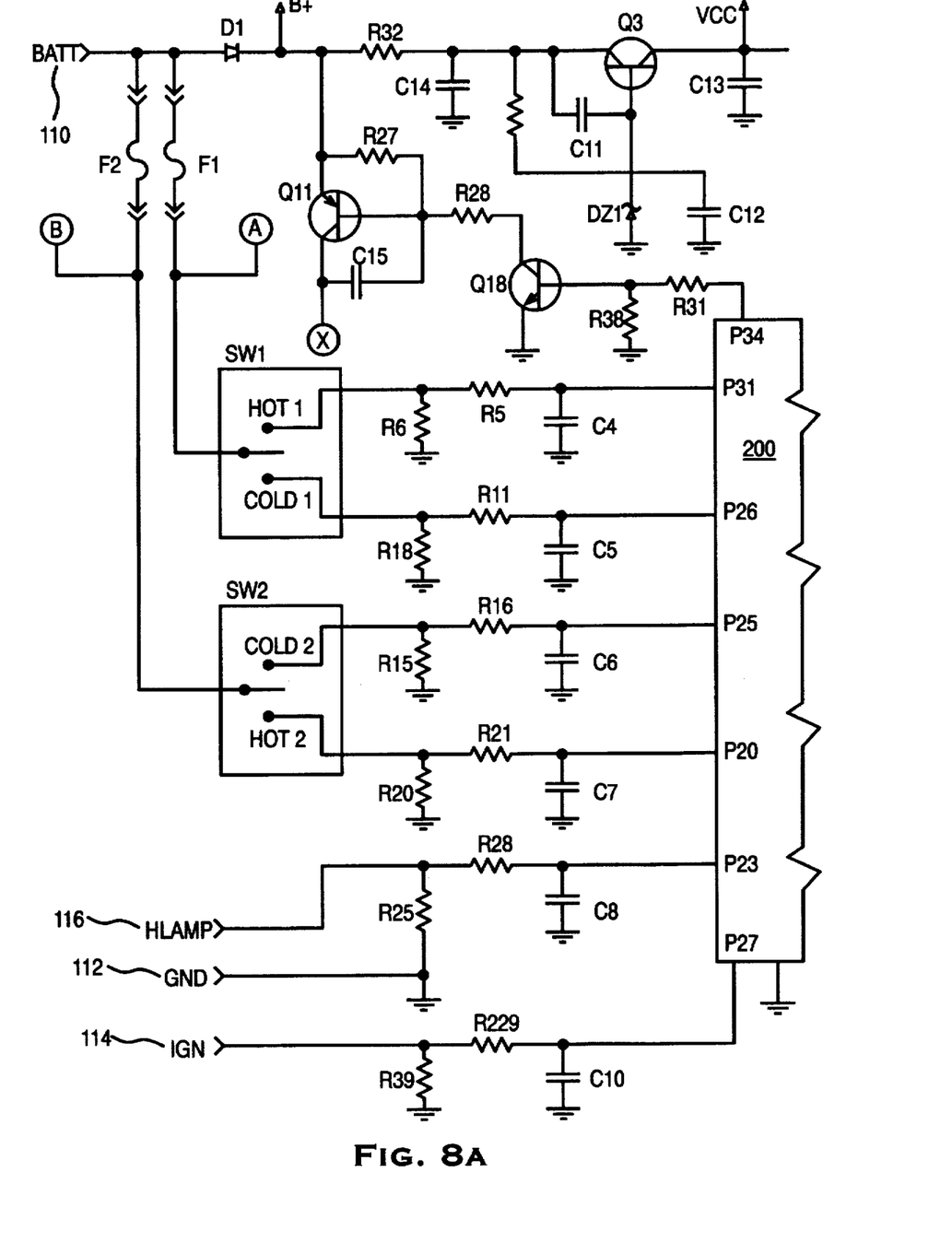
FIGS. 8A and 8B present a schematic circuit of a controller according to the present invention.
Figure 8B:
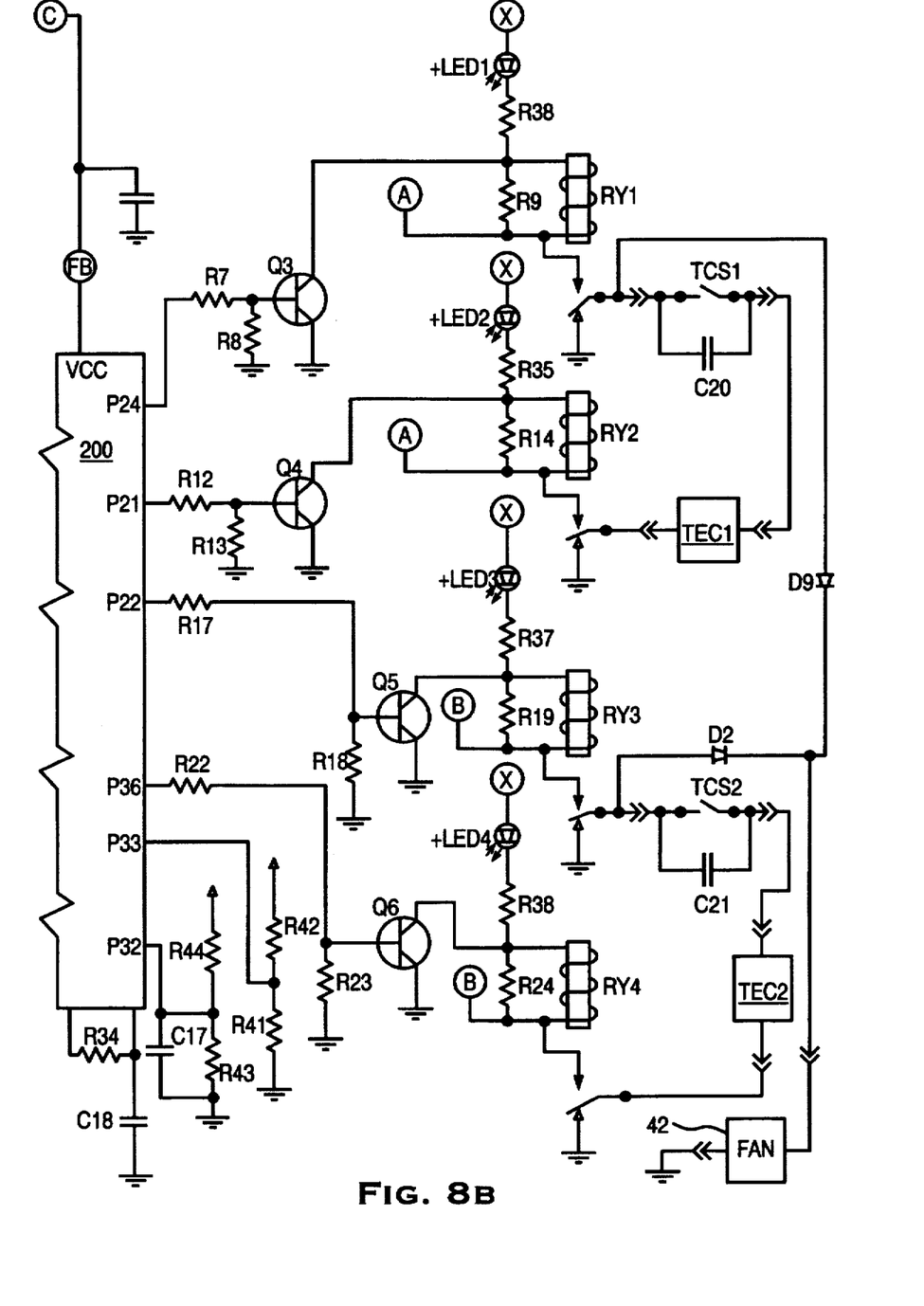

FIGS. 8A and 8B present a schematic circuit illustrating the preferred embodiment of the controller 100 used to operate the device 10. The controller shown is particularly adapted for use in a motor vehicle. Vehicle inputs to the controller include a battery source 110, a common ground connection 112, ignition status 114 and headlamp status 116.

Logic control is provided by the microprocessor 200. One skilled in the art of electronic design would readily appreciate the fact that there can be many other embodiments and modifications to provide logic control such as employing Application Specific Integrated Circuits (ASIC), Programmable Array Logic (PAL) or Discrete Components. The microprocessor 200 is powered by a +5 V source, represented by VCC. This supply voltage is passed through a ferrite bead FB which serves to filter out electrical noise and is input to the microprocessor at pin VCC.

The device 10 is protected from battery overvoltage by electrical circuitry connected to pins P32 and P33. Resistors R41 and R42 form a voltage divider which provides a reference voltage input at pin P33 based on VCC, which preferably is 5 volts. The battery voltage B+ is similarly divided by resistors R43 and R44, and is input to the microprocessor 200 at pin P32. If the battery voltage is too high, the voltage level at pin 32 exceeds the reference voltage at pin P33. When this happens, the microprocessor 200 goes into standby mode in which it remains powered, but does not respond to other inputs.

The ignition status input 114 is presented to the microprocessor 200 at pin P27. This input determines the overall operating mode of the device. When the ignition is off, ignition input 114 is low, and the microprocessor 200 is in the standby mode. In the standby mode, the microprocessor will not respond to any input from switches SW1 or SW2, and most internal functions are stopped so as to minimize parasitic current drain from the vehicle battery.

When the ignition switch is turned oh, a 12 V signal is connected to the ignition input 114. With the ignition switch input high, the microprocessor wakes up and the device is placed in active mode. In active mode, the microprocessor resumes all normal functions and the device responds to inputs from switches SW1 and SW2.

To cool a beverage container placed in chamber 52A, a user closes switch SW1 to the cooling mode. This provides a high signal input to pin P26 on the microprocessor 200. In response, the microprocessor 200 will output a high signal to pin P24, turning on Q3 which lights blue LED1, visually acknowledging the cool mode for that respective chamber.

Turning on Q3 also turns on the relay RY1, closing its normally open switch. Current then passes in a first direction through the thermostatic switch TCS1 and the TEC1, and finally drains through the normally grounded relay switch of relay RY2. Current flow in this direction cools the side of the TEC1 in contact with the heat transfer member 30A, and heats the other side of the TEC1, which is in contact with the heat sink. The thermostatic switch TCS1 generally remains closed in the cooling mode at all times because the heat transfer member 30A remains cold.

When the relay RY1 switch is closed, current also flows through the rectifier diode D9 and the fan 42, turning the latter on, as well. Rectifier diode D2 is used to prevent current to flow to TEC2 when the fan is turned on by relay RY1. With the ignition on, the TEC1 will continue cooling, and the fan will remain on until switch SW1 is returned to the off position.

If the ignition switch is turned off with the user switch SW1 in the cold position, the microprocessor 200 continues to provide a high output to pin 24 and the TEC1 continues to cool and the fan continues to operates. This will continue until either 15 minutes has elapsed or until the switch SW1 is turned off. At that time, the microprocessor 200 will enter the standby mode.

To heat a beverage container in the chamber 52A, the user closes switch SW1 to the heating mode. This provides a high input signal to pin P31 on the microprocessor 200. If the device is in the standby mode, i.e., ignition off, the microprocessor will perform no operations. If the device is in the active mode, the microprocessor will output a high signal at pin P21. This turns on Q4 which, in turn, lights the red RED2, acknowledging the heating mode for that respective chamber.

Turning on Q4 also turns on the relay RY2, closing its normally open switch. Current then passes in a second direction through the TEC1 and the thermostatic switch TCS1, and finally drains through the normally grounded relay switch of relay RY1. Current flow in this direction heats the side of the TEC1 in contact with the heat transfer member 30A, and cools the other side of the TEC1, which is in contact with the heat sink.

Since the thermostatic switch TCS1 is in contact with the heat transfer member 30A, its temperature will rise as the latter heats up. The thermostatic switch TCS1 will open when it heats to a first predetermined value. In the heating mode, the TCS1 will alternately cycle (open and close) to maintain the heat transfer member 30A at a desired temperature range. The heating mode will continue for 90 minutes unless either the switch SW1 is turned off or the vehicle ignition switch is turned off.

When the device is in the standby mode and one (or both) of the switches is placed into the cold mode, no operation will occur until the ignition switch input is switched high. At that time the microprocessor will immediately start the cooling mode.

When the device is in the standby mode and one (or both) of the switches is placed into the hot mode, no operation will occur until the ignition switch is switched high. At that time, the microprocessor will not initiate the heating mode until the switch is returned to the off position and then switched back to the heat mode.

When the vehicle exterior lamps are turned on, the headlamp input 116 will provide a high signal. When the microprocessor detects this input on pin P23, it will pulse width modulate the high side driver circuitry for all the LED's at output pin P34. The high signal will turn on transistor Q10 which then provides a low signal to turn on Q11. As this output is modulated, it will be turned on and off at a duty cycle appropriate to dim the perceived intensity of the LED's to a level more appropriate for night time usage.

A thermal fuse F1 is used to safely shut off the heating unit in the event that the thermostatic switch TCS1 fails to regulate the temperature properly. The fuse provides redundant protection which disables the TEC1 to prevent overheating. The thermal fuse F1 is mechanically retained in close contact with the heat transfer member 30A and opens when its temperature reaches a second predetermined value. Once the fuse F1 opens, it will not close again under normal conditions. The second predetermined value at which the fuse F1 opens is higher than the first predetermined value at which the thermostatic switch TCS1 opens. Fuse F1 and Fuse F2 provide independent protection of TEC1 and TEC2 respectively. If one fuse opens, thus disabling its respective chamber, the other fuse remains intact, thus allowing at least one chamber to continue to operate normally.

The second chamber 52B of the device, operated by switch SW2, functions in much the same way as the first chamber 52A. When switch SW2 is used to cool the second chamber 52A, a high signal is input to pin P25 of the microprocessor 200. This results in a high output at pin P22, turning on transistor Q5, blue LED3 and closing the switch of relay RY3. Current then flows in a first direction through second thermostatic switch TCS2, second heating and cooling element TEC2 and through normally grounded switch of relay RY4. Current also flows through second rectifier diode D2, thus turning on the fan 42.

When the SW2 is used to heat the second chamber, a high input signal is presented at pin P20 of the microprocessor 200. This results in a high output at pin P36, turning on transistor Q6, red LED4 and closing the switch of relay RY4. Current then flows in a second direction through second heating and cooling element TEC2, second thermostatic switch TCS2 and through normally grounded switch of relay RY3. In this case, rectifier diode D2 does not conduct and the fan 42 is not turned on.

Table 1 summarizes the operating conditions of the chambers and the fan given possible combinations of the user switch settings.

TABLE 1

| SW1 (First) | SW2 (Second) | FAN |
| --- | --- | --- |
| OFF | OFF | OFF |
| ON (Cooling) | OFF | ON |
| ON (Heating) | OFF | OFF |
| OFF | ON (Cooling) | ON |
| OFF | ON (Heating) | OFF |
| ON (Cooling) | ON (Heating) | ON |
| ON (Heating) | ON (Cooling) | ON |
| ON (Cooling) | ON (Cooling) | ON |
| ON (Heating) | ON (Heating) | OFF |

In the preferred embodiment, the microprocessor is a Z86C03. Diodes D1, D2 and D9 are 1N4004s and DZ1 is a 1N5232B Zener with a breakdown voltage of 5.6 V. Transistors, Q3, Q4, Q5 and Q6 are MPSA06s, Q9 is a 2N5551, Q10 is a BC547 and Q11 is a BC557. As known to those skilled in the art, VCC is +5 V and B+ is the battery connection which, for most vehicles is 12 V. The controller design includes a number of discrete capacitors and resistors which filter input DC levels and also provide other functions, as known to one skilled in the art.

The resistor and capacitor values are given below in Table 2.

TABLE 2

| ELEMENT | VALUE |
| --- | --- |
| R32 | 120Ω, 2W |
| R36, R37 | 220Ω, ½ W |
| R9, R14, R19, R24 | 820Ω |
| R7, R12, R22, R28 | 1 KΩ |
| R35, R38 | 2 KΩ |
| R34 | 3.0 KΩ, 1% |
| R31 | 10 KΩ |
| R43 | 11 KΩ, 1% |

TABLE 2-continued

| ELEMENT | VALUE |
| --- | --- |
| R8, R13, R18, R23, R27, R33, R39 | 33 KΩ |
| R41 | 47 KΩ, 1% |
| R42, R44 | 220 KΩ, 1% |
| R5, R11, R16, R21, R26, R29, R30 | 100 KΩ |
| R6, R10, R15, R20 | 300 KΩ |
| C16 | 33 pF |
| C11 | 100 pF |
| C4, C5, C6, C7, C8, C10, C12, C17 | 22 nF |
| C3, C13, C21 | 0.1 μF |
| C14 | 100 μF, 50 V |

Given the disclosure of the present invention, one skilled in the art would readily appreciate the fact that there can be many other embodiments and modifications that are well within the scope and spirit of the disclosure set forth herein, but not specifically depicted and described. Accordingly, all expedient modifications readily attainable by one versed in the art from the disclosure set forth herein that are within the scope and spirit of the present invention are to be included as further embodiments of the present invention. The scope of the present invention accordingly is to be defined as set forth in the appended claims.

What is claimed is:

1. A heating and cooling device for at least one beverage in a beverage container comprising:

a chassis;

a first thermoelectric heating and cooling element provided on said chassis;

a first heat transfer member having a first face and a second face, the second face thermally connected to the element;

an electronic controller for controlling application of direct electric current to the element to control heating and cooling functions of the element; and a first beverage container holder having a first container holding chamber defined by a side wall and a bottom, said first holder being formed as a separate unit and lockably engaged in a first position in which the holder is mounted on the chassis with the first face of the heat transfer member protruding through an opening formed in said side wall, from a second position in which the holder is completely detached from the chassis and the first heat transfer member;

wherein the holder is adapted to receive and hold a beverage container, with the first face of the first heat transfer member abutting against a portion of the beverage container.

2. A device according to claim 1, further comprising a spring member mounted to the holder, the spring member being adapted for biasing the beverage container against the first face.

3. A device according to claim 2, wherein the side wall includes a recess or slot diametrically opposite to the first opening, the recess being adapted to removably hold the spring member in place.

4. A device according to claim 1, wherein one of the first holder and the first heat transfer member has opposed guide channels and the other of the first holder and the first heat transfer member has opposed complementary guide rails, the guide channels and the guide rails removably holding the first holder to the first heat transfer member.

5. A device according to claim 1, further including a second thermoelectric heating and cooling element, a second heat transfer member having a first face and a second face, with the second face thermally connected to the second element, and a second beverage container holder having a second container holding chamber defined by a side wall and a bottom, with an opening in the second chamber side wall, through which the first face of the second heat transfer member protrudes, when the second holder is mounted on the chassis.

6. A device according to claim 5, wherein the electronic controller further controls application of direct electric current to the second element to control heating and cooling functions thereof.

7. A device according to claim 5, further comprising a spring member mounted to each of the first and second holders, the spring member being adapted to bias two beverage containers against the first faces of the first and second heat transfer members.

8. A device according to claim 7, wherein the side walls of the first and second chambers each include a recess or chamber diametrically opposite to the first openings of the first and second chambers, each recess being adapted to removably hold the spring member in place.

9. A device according to claim 1, wherein the controller including a thermal fuse, an automatic time-out timer, and an indicator driver.

10. A device according to claim 5, wherein the first holder is discrete from the second holder, and each of the first and second holders is detachable from the chassis.

11. A heating and cooling device for at least one beverage in an beverage container comprising:
 a chassis;
 at least one thermoelectric heating and cooling element provided on said chassis;
 at least one heat transfer member having a first face and a second face, the second face being thermally connected to the element;
 an electronic controller for controlling application of direct current to the element to control heating and cooling functions of the element, the controller including a thermal fuse, an automatic timeout timer, and an indicator driver; and
 at least one beverage container holder mounted on the chassis and adapted to receive and hold the beverage container.

12. A device according to claim 11, wherein the controller receives a plurality of input signals and sends a plurality of control signals, the controller turning off the thermoelectric heating and cooling element after a predetermined lapse of time in response to at least one set of input signals.

13. A device according to claim 11, adapted for use in a motor vehicle, and wherein one of the at least one set of input signals includes an ignition status, the ignition status transitioning from a signal level indicating "ON" to a signal level indicating "OFF".

14. A device according to claim 11, further comprising indicator lights reflecting the mode of operation of the element.

15. A heating and cooling device for at least one beverage in a beverage container comprising:
 a chassis;
 at least one thermoelectric heating and cooling element provided on said chassis;
 at least one heat transfer member having a first face and a second face, the second face thermally connected to the element;
 means for controlling the application of direct electric current to the element to independently control heating and cooling functions of the element; and
 at least one beverage container holder adapted to receive and hold the beverage container, said beverage container holder being formed as a separate unit and lockably engaged in a first position in which the holder is mounted on the chassis, from a second position in which the holder is completely detached from the chassis and the heat transfer member.

16. A device according to claim 15, wherein the controlling means includes a thermal fuse, an automatic time-out timer, and an indicator driver.

17. The device of claim 1 wherein the beverage container holder has a substantially cylindrical side wall.

18. In a device for heating and cooling a beverage in a beverage container, said device including a chassis, a thermoelectric heating and cooling element fixed on said chassis, and a heat transfer member connected to said element, the improvement comprising:
 at least one beverage container holder formed as a separate unit and lockably engaged in a first position in which the holder is mounted on the chassis, from a second position in which the holder is completely detached from the chassis and the heat transfer member, said holder having a substantially cylindrical side wall formed with an opening through which the heat transfer member protrudes, said heat transfer member arranged to abut a beverage container inserted into the beverage container holder, when the beverage container holder is mounted on the chassis.

* * * * *